No. 765,900. PATENTED JULY 26, 1904.
T. McEWING.
BLOCKING AND CULTIVATING MACHINE.
APPLICATION FILED FEB. 23, 1904.
NO MODEL.
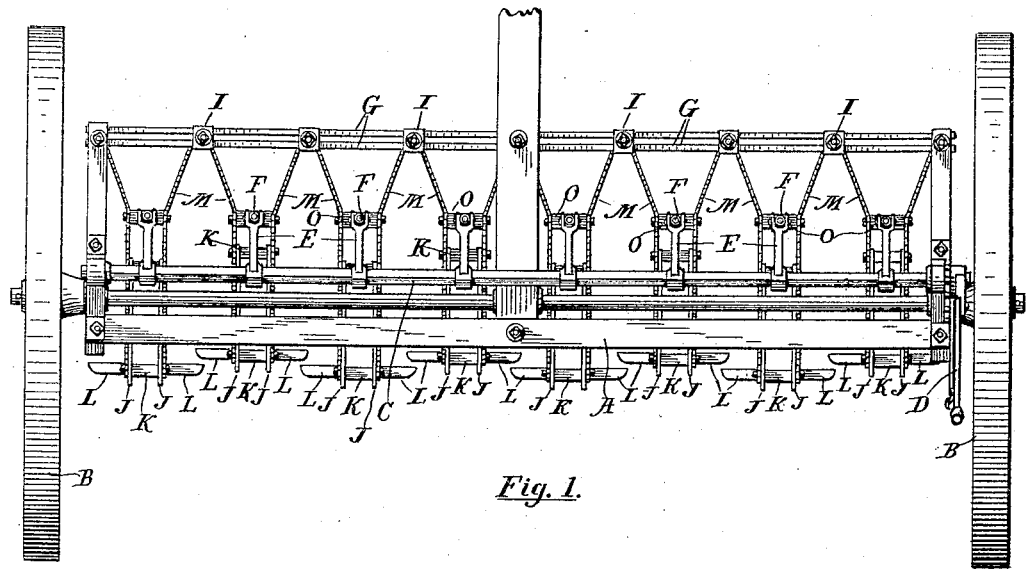
Fig. 1.
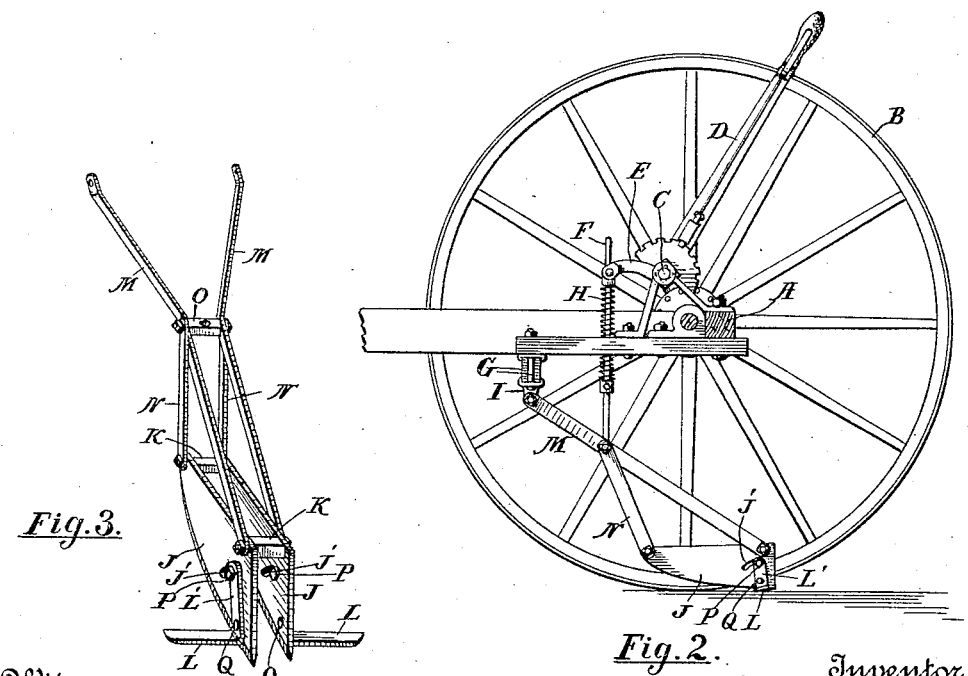
Fig. 3.
Fig. 2.
Witnesses
Georgiana Chace
Edward R. Monroe
Inventor
Thomas McEwing
By Luther V. Moulton
Attorney No. 765,900. Patented July 26, 1904.

UNITED STATES PATENT OFFICE.

THOMAS McEWING, OF LANSING, MICHIGAN, ASSIGNOR TO WESTERN WAGON AND SUPPLY COMPANY, LIMITED, OF LANSING, MICHIGAN, A CORPORATION OF MICHIGAN.

BLOCKING AND CULTIVATING MACHINE.

SPECIFICATION forming part of Letters Patent No. 765,900, dated July 26, 1904

Application filed February 23, 1904. Serial No. 194,976. (No model.)

*To all whom it may concern:*

Be it known that I, THOMAS McEWING, a citizen of the United States, residing at Lansing, in the county of Ingham and State of Michigan, have invented certain new and useful Improvements in Blocking and Cultivating Machines; and I do hereby declare the following to be a full, clear, and exact description of the invention, such as will enable others skilled in the art to which it appertains to make and use the same.

My invention relates to an improved blocker and cultivator for blocking out and cross-cultivating rows of grain or vegetables that have been sown in drills; and its object is to provide a device that may be adjusted for different spacing of the blocks and to provide the same with various new and useful features, hereinafter more fully described, and particularly pointed out in the claims.

My invention consists, essentially, of a device in the nature of a cultivator provided with shoes or cutters arranged in pairs and adjustably spaced apart and having adjustably attached thereto suitable cultivator-blades whereby when the device is moved transversely of the rows of grain or vegetables the portions of the rows that pass between the shoes or cutters will be left untouched and the remainder of the rows will be destroyed by the cultivator-blades and in the combination and arrangement of parts, as will more fully appear by reference to the accompanying drawings, in which—

Figure 1 is a plan view of a device embodying my invention; Fig. 2, a side elevation of the same with one wheel removed, and Fig. 3 an enlarged perspective detail of one pair of the shoes or cutters with the draw-bars and cultivator-blades attached thereto.

Like letters refer to like parts in all of the figures.

A represents the frame supported on wheels B and having a rock-shaft C mounted thereon and provided with the adjusting-lever D and having the lifting-arms E on the rock-shaft and provided with the vertical connecting-rods F and pressure-springs H to operate the shoes and cultivators. So far the device resembles the mechanism of an ordinary drill or cultivator, and the novelty of my device consists in the following parts and in the combination and arrangement thereof: Across the front of the frame are parallel bars G, spaced apart, between which extend suitable bolts, which adjustably secure the clamps I to the bars. To the under side of these clamps are pivoted the flexible draw-bars M of the shoes. The clamps are made adjustable on the bars G to adjustably space apart the respective pairs of shoes or cutters J to which the draw-bars are attached. These shoes are arranged in pairs, as shown, and each pair spaced apart by spacing-blocks K between the shoes and like spacing-blocks O between the draw-bars. These blocks are readily changed for others of different length as occasion requires to change the space between the respective pairs of shoes J. Upon the outer side of each shoe and near the rear lower angle thereof is attached a cultivator-blade consisting of a suitable plate of steel bent at right angles, the horizontal portion L of which projects horizontally from the shoe and enters the soil somewhat below the surface, and the vertical portion L' extends upward upon the outer side of the shoe J and is pivoted thereto near the angle and is adjustably secured thereto by a bolt near the upper end extending through and adjustable in a curved slot J' in the shoe or blade, whereby the angle of inclination of the horizontal portion L may be varied at pleasure. The flexible draw-bars M are attached to the rear upper angles of the shoes, and brace-bars N extend from the draw-bars opposite the spacing-block O to the forward angles of the shoes, and a lifting-rod H is attached to the spacing-block O, whereby the shoes and cultivators are lifted out of the soil by means of the lever D in the usual way or pressed into the soil by the spring H, as in the case of cultivators or drills.

The draw-bars of each alternate pair of shoes are made somewhat shorter, whereby the cultivator-blades L can be adjusted to overlap each other, and thus the space be-